(12) United States Patent
Lee (10) Patent No.: US 9,359,231 B2
(45) Date of Patent: Jun. 7, 2016

(54) ELECTROLYTIC BATH FOR MANUFACTURING ACID WATER AND USING METHOD OF THE WATER

(71) Applicants: MAG Technology Co., Ltd., Gyeonggi-do (KR); Byounglyeol Kim, Gyeonggi-do (KR)

(72) Inventor: Jae Yong Lee, Gyeonggi-do (KR)

(73) Assignees: MAG TECHNOLOGY CO., LTD., Gyeonggi-Do (KR); BYOUNGLYEOL KIM, Gyeonggi-Do (KR)

(*) Notice: Subject to any disclaimer, the term of this patent is extended or adjusted under 35 U.S.C. 154(b) by 27 days.

(21) Appl. No.: 14/566,879

(22) Filed: Dec. 11, 2014

(65) Prior Publication Data

US 2015/0368812 A1 Dec. 24, 2015

(30) Foreign Application Priority Data

Jun. 18, 2014 (KR) .................. 10-2014-0074066
Jul. 23, 2014 (KR) .................. 10-2014-0092970

(51) Int. Cl.
| | | |
|---|---|---|
| C02F 1/461 | (2006.01) |
| C25B 9/08 | (2006.01) |
| C25B 1/10 | (2006.01) |
| C25B 11/03 | (2006.01) |
| C25B 11/04 | (2006.01) |

(52) U.S. Cl.
CPC ........... *C02F 1/4618* (2013.01); *C02F 1/46104* (2013.01); *C25B 1/10* (2013.01); *C25B 9/08* (2013.01); *C25B 11/035* (2013.01); *C25B 11/04* (2013.01)

(58) Field of Classification Search
None
See application file for complete search history.

(56) References Cited

U.S. PATENT DOCUMENTS

| | | | | |
|---|---|---|---|---|
| 4,308,117 A * | 12/1981 | Sweeney | ............. | C02F 1/46109 204/255 |
| 5,534,120 A * | 7/1996 | Ando | .................... | C02F 1/4618 204/269 |
| 6,183,623 B1 * | 2/2001 | Cisar | ...................... | B01D 53/22 204/252 |
| 6,251,259 B1 * | 6/2001 | Satoh | .................. | C02F 1/46104 204/229.6 |
| 6,475,371 B1 * | 11/2002 | Shirahata | ............... | A61K 33/00 205/464 |
| 6,500,458 B1 * | 12/2002 | Shirahata | .............. | C02F 1/4618 424/466 |
| 6,547,947 B1 * | 4/2003 | Uno | ...................... | C02F 1/4672 204/263 |
| 2002/0074241 A1 * | 6/2002 | Natsume | ................... | A23L 2/50 205/688 |
| 2003/0056805 A1 * | 3/2003 | Sumita | .................... | A61L 2/035 134/1.3 |
| 2005/0189237 A1 * | 9/2005 | Sano | ..................... | C02F 1/4618 205/746 |
| 2007/0148256 A1 * | 6/2007 | Yanagihara | ............. | A23L 1/302 424/600 |

FOREIGN PATENT DOCUMENTS

| | | |
|---|---|---|
| KR | 10-0660609 B1 | 12/2006 |
| KR | 10-0928685 B1 | 11/2009 |
| KR | 10-1178880 B1 | 9/2012 |
| KR | 10-2014-0008770 A | 6/2014 |

* cited by examiner

*Primary Examiner* — Harry D Wilkins, III
(74) *Attorney, Agent, or Firm* — Bacon & Thomas, PLLC (57) ABSTRACT

An electrolytic bath for manufacturing acid water capable of securing sufficient conductivity even in pure water or deionized water without separately using a catalyst or an ion exchange resin, electrolyzing the pure water or deionized water as well as tap water, and particularly minimizing a reaction between ions and a gas through a deaeration effect and an electrolytic effect in one electrolytic process, increasing conductivity of acid water, and enhancing reduction potential and maintenance time of dissolving power, to obtain acid water (hydrogen water) as stable acid reduced water.

14 Claims, 4 Drawing Sheets

ELECTROLYTIC BATH FOR MANUFACTURING ACID WATER AND USING METHOD OF THE WATER

CROSS-REFERENCE TO RELATED APPLICATION

This application claims priority to and the benefit of Korean Patent Application No. 10-2014-0074066, filed on Jun. 18, 2014, and Korean Patent Application No. 10-2014-0092970, filed on Jul. 23, 2014, the disclosure of which is incorporated herein by reference in its entirety.

BACKGROUND

1. Field of the Invention

The present invention relates to an electrolytic bath for manufacturing acid water and a using method of the water, and more particularly, to an electrolytic bath for manufacturing acid water, which is capable of electrolyzing pure water (RO) or deionized water (DI) having low conductivity as well as tap water without using an ion exchange resin and obtaining high density acid water, and can also simultaneously obtain a deaeration effect and an electrolytic effect during an electrolytic process performed all at once, thereby obtaining the stable high density acid water, and a using method of the water.

2. Discussion of Related Art

As acid water and alkaline water obtained by electrolyzing water is beneficial to the human body and is used for a range of purposes such as sterilization, various electrolytic baths for obtaining such functional water are being developed. Patent documents 1 and 2 disclose configurations for obtaining alkaline reduced water, patent document 3 discloses a configuration capable of controlling an output amount of acid and alkaline electrolyzed water, and patent document 4 discloses a configuration capable of obtaining acid oxidized water and acid reduced water.

In patent document 1 which relates to an electrolytic bath for producing alkaline reduced water, a surface area of a cathode electrode in contact with an electrolyte is formed to be greater than that of an anode electrode in contact with the electrolyte, the anode electrode is mounted in an anode chamber of which an upper portion is opened, a cathode chamber in which the cathode electrode is mounted is disposed in series at a side surface of the anode chamber, an outlet port formed at the anode chamber is formed to be in communication with an inlet port of the adjacent cathode chamber, and the outlet port of the n−1th cathode chamber disposed in sense is configured to be in communication with the inlet port of the adjacent nth cathode chamber. Therefore, a pH of water may be changed without adding chemicals, and thus the obtained alkaline reduced water is useful for washing surface particles of a semiconductor wafer, a photo mask, or the like, and since only deionized water or pure water is used as raw material water, damage to a pattern and oxidation of a surface may be prevented, and in particular, since drained water may be reused at a low cost, environmental problems may be reduced.

Patent document 2 relates to an electrolytic water purifier capable of electrolyzing water twice to obtain weak alkaline drinking water, and in particular, capable of automatically controlling an applied voltage according to a change in an input amount of introduced water and thus stably performing an electrolytic process, to thereby stably and economically produce and supply high quality weak alkaline water.

Patent document 3 relates to an electrolytic bath capable of controlling an output amount of acid water and alkaline electrolyzed water according to strong and weak electrolytic processes by controlling a flow rate of the acid water and alkaline electrolyzed water produced and output from the electrolytic bath according to the strong and weak electrolytic processes at a flow rate changing valve and then outputting the acid water and alkaline electrolyzed water to the flow passage changing valve, which solves a problem of inconvenience in which a user has to use two kinds of products even when strong electrolyzed water is required, as well as reducing purchasing cost of the products and thus improving economical efficiency.

When the electrolytic process is performed in a conventional electrolytic bath using a catalyst, it is possible to obtain water having acidic pH and oxidizing power at a cathode side and water having alkaline pH and reducing power at an anode side. However, patent document 4 provides an electrolytic bath for manufacturing acid water that is capable of obtaining water (acid reduced water) having acidic pH and reducing power at a cathode side and water (acid oxidized water) having acidic pH and oxidizing power at an anode side without using the catalyst, and a using method of the acid reduced water.

However, the conventional electrolytic bath has problems as follows:

(1) Since the conventional electrolytic bath uses pure water (RO) or deionized water (DI) as raw material water, and the raw material water has low conductivity, and an ion exchange resin has to be used to increase the conductivity.

(2) When the ion exchange resin is repeatedly used in the electrolytic bath, thermal resistance of the ion exchange resin is deteriorated, and thus a life span thereof is reduced.

(3) In the electrolytic process, a decomposition reaction generally occurs at each surface of a cathode electrode and an anode electrode. However, in the conventional electrolytic bath, there is a problem in that electrolytic efficiency is degraded at a portion which is not directly in contact with the electrode surface.

(4) When the electrolytic process is performed in the electrolytic bath using tap water, pure water or deionized water as the raw material water, hydrogen water is obtained as reduced water at the cathode side. At this time, the hydrogen water has low reducing power and dissolving power for hydrogen, a maintenance time thereof is short, and a life span of the hydrogen water is also short.

(5) Particularly, in the reduced water, since the hydrogen reacts with a gas dissolved in the water in a high temperature atmosphere, loses activity, or evaporates, reduction potential or the maintenance time of the dissolving power is further shortened.

RELATED TECHNICAL DOCUMENTS

Patent Document (Patent document 1) Korean Patent No. 0660609 (registered on Dec. 15, 2006)

(Patent document 2) Korean Patent No. 0928685 (registered on Nov. 19, 2009)

(Patent document 3) Korean Patent No. 1178880 (registered on Aug. 27, 2012)

(Patent document 4) Korean Unexamined Patent Application Publication No. 10-2014-0008770 (published on Jan. 22, 2014)

SUMMARY OF THE INVENTION

The present invention is directed to an electrolytic bath for manufacturing acid water capable of securing sufficient conductivity even with pure water or deionized water without separately using a catalyst or an ion exchange resin, electrolyzing the pure water or deionized water as well as tap water, and particularly minimizing a reaction between ions and a gas through a deaeration effect and an electrolytic effect in only one electrolytic process, increasing conductivity of acid water, and enhancing reduction potential and maintenance time of dissolving power, thereby obtaining acid water (hydrogen water) as stable acid reduced water, and a using method of the water.

The present invention is also directed to an electrolytic bath for manufacturing acid water that can be configured to obtain the deaeration effect and the electrolytic effect again by circulating some of the obtained acid water or to enable the raw material water to remain in a compartment for the electrolytic process as long as possible, such that sufficient ion exchange occurs after the electrolytic process with the deaeration effect and thus conductivity of the acid water and density of hydrogen are further increased, and a using method of the water.

The present invention is also directed to an electrolytic bath for manufacturing acid water that may be configured to mix the acid oxidized water in which hydrogen ions are separated by the deaeration and the ion exchange with the acid reduced water serving as the hydrogen water obtained by the ion exchange, such that components such as hydrogen peroxide and ozone are contained in the acid reduced water along with ions and molecules that may be obtained by the electrolytic process, and thus the acid reduced water may be used as cleaning water or the like as well as drinking water, and a using method of the water.

According to an aspect of the present invention, there is provided an electrolytic bath for manufacturing acid water, including a housing (100) having first, second and third compartments (110a, 110b and 110c) divided by two ion exchange membranes (111) installed to be spaced a predetermined distance from each other therein, a first inlet port (112a) and a first outlet port (113a) provided at the first compartment (110a), a second inlet port (112b) and a second outlet port (113b) provided at the second compartment (110b), and a third inlet port (112c) and a third outlet port (113c) provided at the third compartment (110c); two first electrodes (200) which are installed in the second compartment (110b) to face each other and also to be spaced a predetermined distance (W1) from each of the ion exchange membranes (111), and to which positive poles are applied; two second electrodes (300) which are installed at each of the first and third compartments (110a and 110c) to be adjacent to each of the ion exchange membranes (111), and to which negative poles are applied; and two third electrodes (400) which are installed at each of the first and third compartments (110a and 110c) to be space a predetermined distance (W2) from each of the second electrodes (300), and to which negative poles are applied, wherein the first outlet port (113a) is connected with the third inlet port (112c).

The distance (W1) may be 0.1 to 2.0 mm, and may be used as a filling space through which water passes, and the distance (W2) may be 0.1 to 100.0 mm, and may be used as a filling space through which raw material water passes.

The first and third compartments (110a and 110c) may have therein at least one partition wall (114) provided at a predetermined position to change a flow direction of a fluid and thus to extend a staying time of the fluid.

A branch pipe (120) may be provided at the third outlet port (113c) to be connected with the first inlet port (112a) configured to receive raw material water from an outside, and a first valve (121) may be installed at the branch pipe (120) to selectively supply or block branched acid water into the first inlet port (112a), and a second valve (122) may be installed at the first inlet port (112a) to selectively supply or block the raw material water from the outside through the first inlet port (112a) when the acid water discharged from the third outlet port (113c) is supplied into the first compartment (110a).

The second outlet port (113b) and the third outlet port (113c) may be combined, and the acid water discharged through the combined second and third outlet ports (113b and 113c) may contain $H_2$, $H^+$, $H_2O_2$, and $O_3$.

The ion exchange membranes (111) may be fluorinated cation exchange membranes.

The first, second and third electrodes (200, 300 and 400) may be porous platinum electrodes or platinum mesh electrodes. An electrical conductivity of the acid water discharged to the first outlet port (113a) may be 0.067 to 2.000 μS/cm, and an electrical conductivity of the acid water discharged to the third outlet port (113c) may be 0.1 to 50.0 μS/cm.

The acid water discharged from the third outlet port (113c) may have an oxidation-reduction potential of −100 to −700 mV at a temperature of 0 to 100° C., and the acid water may have a dissolved hydrogen density of 0.2 to 3.0 ppm at the temperature of 0 to 100° C., and the acid water may have a pH of 4.0 to 7.5 at the temperature of 0 to 100° C.

According to another aspect of the present invention, there is provided a using method of the acid water obtained by the electrolytic bath of the present invention, wherein the acid water is used as drinking water, cleaning water for removing organic materials and particles from a semiconductor wafer, a wafer carrier, an LCD glass, an optical lens and an OLED, or antistatic water.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF MAIN ELEMENTS

| | |
|---|---|
| 100: housing | 110a to 110c: first to third compartments |
| 111: ion exchange membrane | 114: partition wall |
| 112a to 112c: first to third inlet ports | |
| 113a to 113c: first to third outlet ports | |
| 120: branch pipe | 200: first electrode |
| 300: second electrode | 400: third electrode |

DETAILED DESCRIPTION OF THE INVENTION

Exemplary embodiments of the present invention will be described in detail below with reference to the accompanying drawings. It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is merely a preferable example for the purpose of illustrations only not intended to limit the scope of the invention, and thus it should be understood that other equivalents and modifications could be made thereto without departing from the spirit and scope of the invention.

First Embodiment

Configuration

Figure 1:
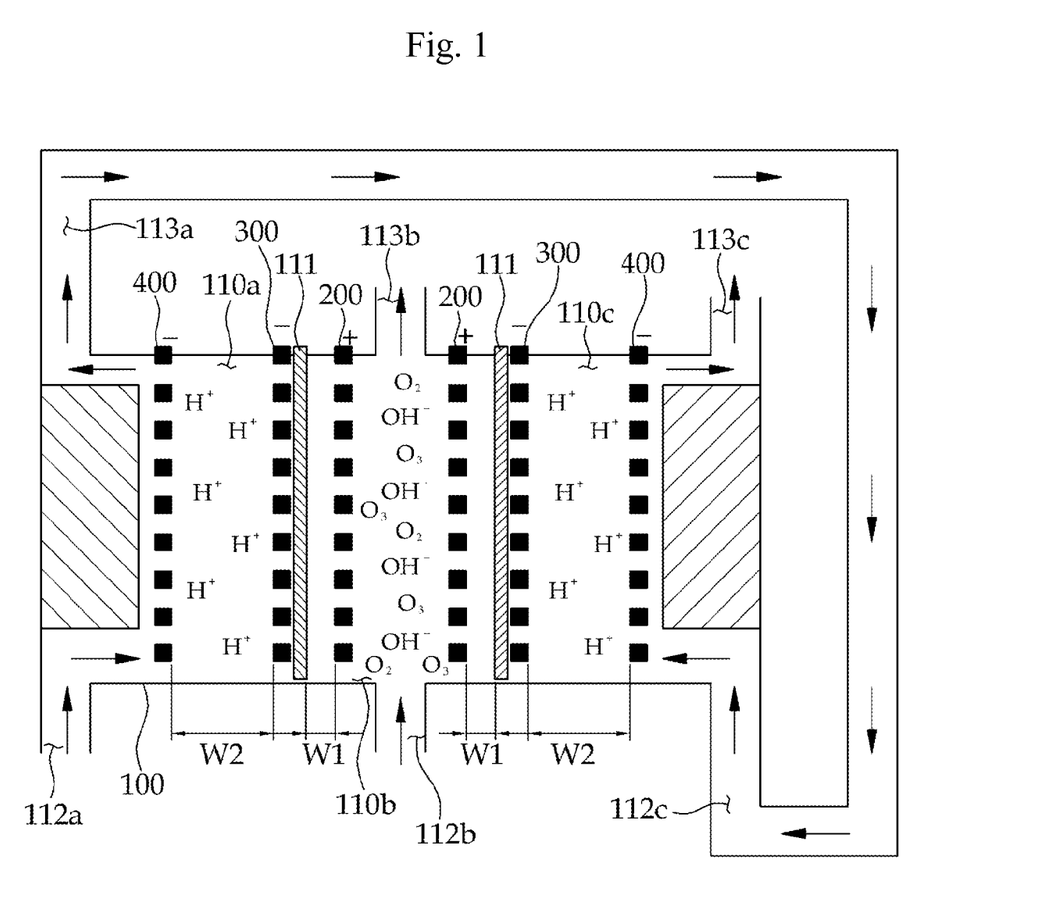
FIG. 1 is a conceptual view schematically illustrating an entire configuration of an electrolytic bath for manufacturing acid water according to a first embodiment of the present invention.

As illustrated in FIG. 1, an electrolytic bath for manufacturing acid water according to a first embodiment of the present invention includes a housing 100 having three first, second and third compartments 110a, 110b and 110c which are divided by two ion exchange membranes 111, two first electrodes 200 installed at the second compartment 110b to be spaced a predetermined distance W1 from each ion exchange membrane 111, two second electrodes 300 installed at the first and third compartments 110a and 110c to be adjacent to each ion exchange membrane 111, and two third electrodes 400 installed at the first and third compartments 110a and 110c to be spaced a predetermined distance W2 from each second electrode 300.

In particular, inlet ports 112a, 112b, 112c and outlet ports 113a, 113b, 113c are provided at the first, second and third compartments 110a, 110b and 110c, respectively, and the first outlet port 113a formed at the first compartment 110a is connected with the third inlet port 112c formed at the third compartment 110c. Therefore, while one electrolytic process is performed, hydrogen ions are exchanged with the two first and third compartments 110a and 110c disposed at both sides of the second compartment 110b, a deaeration action occurs, hydrogen water (acid reduced water) in which the deaeration action occurs is supplied again to the third compartment 110c, the electrolytic process is performed again, and thus the density of hydrogen may be increased.

Hereinafter, the configuration thereof will be described below in more detail. As illustrated in FIG. 1, the housing 100 is formed in a hollow shape, and the three first, second and third compartments 110a, 110b and 110c divided by the two ion exchange membranes 111 are formed therein. The one inlet port 112a, 112b, 112c and the one outlet port 113a, 113b, 113c are provided at each of the first, second and third compartments 110a, 110b and 110c.

In particular, the two first and third compartments 110a and 110c, excluding the central second compartment 110b enclosed by the two ion exchange membranes 111, are configured to be connected with each other. That is, the first outlet port 113a formed at the first compartment 110a is connected with the third inlet port 112c formed at the third compartment 110c.

In the embodiment of the present invention, any membranes may be used as the ion exchange membranes 111 as long as hydrogen ions may be exchanged therethrough. For example, fluorinated cation exchange membranes (Nafion 117 manufactured by DuPont) may be used.

As illustrated in FIG. 1, the two first electrodes 200 are installed in the second compartment 110b divided by the two ion exchange membranes 111. At this time, the first electrodes 200 are installed to be spaced the predetermined distance W1 from each of the ion exchange membranes 111. With such a configuration, a filling space having a predetermined size is secured between the first electrodes 200 and the ion exchange membranes 111, and thus as raw material water filled therein is electrolyzed, the ion exchange may be easily achieved.

To this end, the first electrodes 200 are installed so that the distance W1 between the first electrodes 200 and the ion exchange membranes 111 is 0.1 to 2.0 mm. This is because, if the distance W1 is formed to be greater than these values, electrolytic performance at the second electrodes 300, which will be described later, is degraded.

As the first electrodes 200, porous platinum electrodes or platinum mesh electrodes mainly used in electrolysis may be used, and the same type of electrodes may also be used as the second and third electrodes 300 and 400 to be described later. The reason why the electrodes are formed in the porous or mesh type is to widen surfaces of the electrodes, in which the electrolysis is substantially performed, and thus to increase an electrolytic effect.

The above-mentioned first electrodes 200 are installed in the second compartment 110b, and positive poles are applied thereto.

As illustrated in FIG. 1, the two second electrodes 300 are installed at each of the first and third compartments 110a and 110c. At this time, the second electrodes 300 are installed to be adjacent to the ion exchange membranes 111, such that the predetermined distance with the first electrode 200 may be maintained.

Negative poles, which are opposite to the first electrodes 200 are applied to the second electrodes 300. As described above, the second electrodes 300 may be formed of the same material as the first electrodes 200.

As illustrated in FIG. 1, the two third electrodes 400 are installed at the first and third compartments 110a and 110c. At this time, each of the third electrodes 400 is installed to be spaced the predetermined distance W2 from one of the second electrodes 300. The distance W2 is 0.1 to 100.0 mm, and this space is used as an ion filling space.

Like the second electrodes 300, the negative poles are applied to the third electrodes 400, and the third electrodes 400 may be formed of the same material as the first electrodes 200.

(Operation)

As illustrated in FIG. 1, the electrolytic bath for manufacturing the acid water according to the first embodiment of the present invention receives the raw material water through the first and second inlet ports 112a and 112b. At this time, when the positive poles are applied to the first electrodes 200, and the negative poles are applied to the second and third electrodes 300 and 400, electrolysis is performed.

At this time, in the electrolytic bath for manufacturing the acid water according to the present invention, the electrolysis and the ion exchange occur between the first compartment 110a and the second compartment 110b and between the second compartment 110b and the third compartment 110c. That is, the electrolysis is performed between the positive first electrodes 200 installed in the second compartment 110b and the negative second and third electrodes 300 and 400 installed in each of the first and third compartments 110a and 110c, and the hydrogen ions are moved from the second compartment 110b to the first and third compartments 110a and 110c, and thus the ion exchange is performed.

As the electrolysis is performed as described above, the raw material water supplied to the second compartment 110b has few hydrogen ions (H$^+$), and contains ions, gas atoms, molecules, and the like which are generally included in the raw material water, and an action like deaeration is performed.

That is, as the electrolysis is performed, hydrogen ions (H$^+$), hydroxyl ions (OH$^-$), ozone (O$_3$), oxygen molecules (O$_2$) and the like are contained in the raw material water supplied to the first and second compartments 110a and 110b through the first and second inlet ports 112a and 112b. At this time, the hydrogen ions (H$^+$) are moved to the first compartment 110a or the third compartment 110c through the ion exchange membranes 111, and the rest are moved to the second compartment 110b. Therefore, acid reduced water containing the hydrogen ions (H$^+$) is discharged through the outlet port 113a of the first compartment 110a and the third outlet port 113c of the third compartment 110c, and acid oxidized water containing the few hydrogen ions (H$^+$), the hydroxyl ions (OH$^-$), the ozone (O$_3$), the oxygen molecules (O$_2$) and the like is discharged through the second outlet port 113b of the second compartment 110b.

Therefore, the acid water according to the present invention is the water discharged through the first and third outlet ports 113a and 113c which mainly contains the hydrogen ions (H$^+$) is, and it is possible to obtain an effect as if a deaeration action were performed.

Meanwhile, in the embodiment of the present invention, the first outlet port 113a is connected to the third inlet port 112c so that the acid water discharged from the first outlet port 113a is supplied to the third compartment 110c. This serves to circulate and electrolyze the acid reduced water having a predetermined density of hydrogen together due to the deaeration action when the electrolysis enabling the deaeration action is performed, as described above, and thereby to further increase the hydrogen density of the acid reduced water.

In the electrolytic bath for manufacturing acid water according to the present invention, as described above, while the electrolysis is performed once, the deaeration action and the electrolysis in which the acid reduced water obtained from the deaeration action is circulated again and then electrolyzed are performed at the same time, and thus the concentration of the hydrogen ions may be increased, and a high potential difference obtained by a difference of the concentration may be effectively used in electrolyzing pure water (RO) or deionized water (DI) having low conductivity as well as generally used tap water.

In the embodiment of the present invention, the acid reduced water discharged through the first outlet port 113a after the deaeration action may have an electric conductivity of 0.067 to 2.000 μS/cm, and the acid water discharged through the third outlet port 113c after receiving and electrolyzing the acid reduced water may have an electrical conductivity of 0.1 to 50.0 μS/cm.

Further, in the embodiment of the present invention, the acid water discharged through the third outlet port 113c has an oxidation-reduction potential of −100 to −700 mV, a dissolved hydrogen concentration of 0.2 to 3.0 ppm and a pH of 4.0 to 7.5 at a temperature of 0 to 100° C.

The material properties of the acid water according to the present invention are as follows.

<Electrical Conductivity Test Result of Electrolysis Result Using Deaerated Raw Material Water>

In order to obtain a change of material properties according to a change of the distance W2 with respect to the acid water obtained from the cathode side, i.e., the above-mentioned compartment 110c using the electrolytic bath for manufacturing the acid water according to the present invention, the following test was performed.

Raw material water: water (having a conductivity of 10 μS/cm or less, a pH of 7.0, an oxidation-reduction potential (ORP) of +230 mV and a temperature of 25.5° C.)

Power: DC 24 V, 20 A

Flow speed (Flow rate): 0.3 l/min

Measuring device: a measuring machine manufactured by TOA pH: TOA-21P

ORP: TOA-21P

DH (density of hydrogen): TOA DH-35A

The measured results are shown in the following table.

TABLE 1

| Distance | Material properties | | |
|---|---|---|---|
| | pH | ORP | DH |
| 2 mm | 4.82 | −653 mV | 1.43 ppm |
| 5 mm | 5.05 | −620 mV | 1.21 ppm |
| 10 mm | 5.37 | −586 mV | 0.97 ppm |
| 20 mm | 5.83 | −534 mV | 0.81 ppm |
| 30 mm | 6.20 | −508 mV | 0.77 ppm |
| 40 mm | 6.42 | −472 mV | 0.68 ppm |
| 50 mm | 6.75 | −426 mV | 0.52 ppm |
| 60 mm | 6.81 | −398 mV | 0.43 ppm |
| 70 mm | 6.98 | −327 mV | 0.32 ppm |

As shown in Table 1, it may be understood that the entire acid water according to the first embodiment of the present invention is acidic, and particularly, has strong acidity as the distance W2 becomes narrow, and the ORP is also increased as the distance W2 become narrow.

Further, it may also be understood that the acid water is the acid reduced water.

<Change in ORP According to Change in Temperature>

The following is a result of measuring the ORP of a comparative embodiment and the acid water (the embodiment) discharged through the compartment 110c of the electrolytic bath for manufacturing the acid water of the first embodiment of the present invention according to a change in temperature. The measuring conditions are as follows:

Raw material water: water (having a conductivity of 10 μS/cm or less, a pH of 6.8, an oxidation-reduction potential (ORP) of +230 mV and a temperature of 25.5° C.)

Power: DC 24 V, 20 A

Flow speed (Flow rate): 0.3 l/min

Measuring device: a measuring machine manufactured by TOA

DH: TOA DH-35A

ORP: TOA-21P

Table 2 shows measured results of the embodiment, and Table 3 shows measured results of the comparative embodiment. Here, the comparative embodiment is results measured through an electrolytic bath for manufacturing acid water, which is configured with two compartments and the inlet port and the outlet port provided at each compartment, as illustrated in FIG. 1 of the patent document 4 which was filed by the applicant.

TABLE 2

| Temperature (° C.) | 5 | 20 | 35 | 50 | 65 | 80 | 95 |
|---|---|---|---|---|---|---|---|
| ORP (mV) | −584 | −580 | −565 | −560 | −548 | −535 | −530 |

TABLE 3

| Temperature (° C.) | 5 | 20 | 35 | 50 | 65 | 80 | 95 |
|---|---|---|---|---|---|---|---|
| ORP (mV) | −592 | −586 | −570 | −356 | −154 | +120 | +200 |

As shown in Table 2 and Table 3, it may be understood that the comparative embodiment is lower in ORP than the embodiment at low temperature, but an increase range of the ORP of the comparative embodiment is gradually increased as the temperature increases, and finally inverted to a positive value at a temperature of 80° C. However, in the case of the embodiment, it may be understood that the OPR at a temperature of 95° C. is increased, compared with that at a temperature of 5° C., but a changed width thereof is incomparably smaller than that of the comparative example. That is, the embodiment is hardly affected by the temperature change.

Therefore, the acid water according to the embodiment of the present invention has a low tendency to be oxidized or reduced, compared with the comparative example. As a result, it is possible to obtain the acid water having higher purity.

<Comparison of DH Dissolved in Acid Water>

The dissolved DH of the embodiment and the comparative embodiment was measured in the same method as that of measuring the ORP. As a result, Table 4 shows the changed in the dissolved DH of the embodiment, and Table 5 shows the dissolved DH of the comparative embodiment.

TABLE 4

| Temperature (° C.) | 5 | 20 | 35 | 50 | 65 | 80 | 95 |
|---|---|---|---|---|---|---|---|
| DH (ppm) | 1.25 | 1.22 | 1.19 | 1.07 | 0.98 | 0.87 | 0.76 |

TABLE 5

| Temperature (° C.) | 5 | 20 | 35 | 50 | 65 | 80 | 95 |
|---|---|---|---|---|---|---|---|
| DH (ppm) | 1.19 | 1.17 | 1.08 | 0.36 | 0.28 | 0.13 | 0.05 |

As shown in Table 4 and Table 5, it may be understood that the dissolved DHs of both the embodiment and the comparative embodiment become small as the temperature is increased. In particular, it may be understood that, as the temperature is increased, the dissolved DH is slowly reduced in the embodiment, but sharply reduced in the comparative embodiment. As a result, at high temperatures, the dissolved DH of the embodiment is about 1.3 times that of the comparative embodiment.

<Comparison of Change in Electrical Conductivity>

In order to obtain a change in electrical conductivity of the acid water obtained from the cathode side, i.e., the above-mentioned compartment 110c of the electrolytic bath for manufacturing the acid water according to the present invention, the electrical conductivity was measured as follows:

Raw material water: water (having a conductivity of 0.057 µS/cm or less, a pH of 7.0 and a temperature of 25.5° C.)
Power: DC 24 V, 20 A
Flow speed (Flow rate): 0.5 l/min
Measuring device: TOA/DKK CM-30R The following is a result of measuring the electrical conductivity according to a change of current using the measuring device, while the current applied to the present invention is changed as shown in Table 6.

TABLE 6

| | Current (A) | | | | | | | | |
|---|---|---|---|---|---|---|---|---|---|
| | 1 A | 2 A | 3 A | 4 A | 5 A | 6 A | 7 A | 8 A | 9 A |
| Electrical conductivity (µS/cm) | 0.087 | 0.114 | 0.257 | 1.5 | 5.2 | 9.3 | 12.7 | 20.5 | 32.1 |

As shown in Table 6, it may be understood in the embodiment that ionic water is increased as the intensity of current applied to the electrolytic bath for manufacturing the acid water according to the present invention is increased, and thus an increasing ratio of the electrical conductivity is further increased.

As described above, the acid water, which is the acid reduced water generated through the deaeration action and the electrolysis action during one electrolytic process, may be obtained through the present invention, and thus it is possible to obtain the acid water having the high conductivity as well as the high density of hydrogen ions.

Second Embodiment

Figure 2:
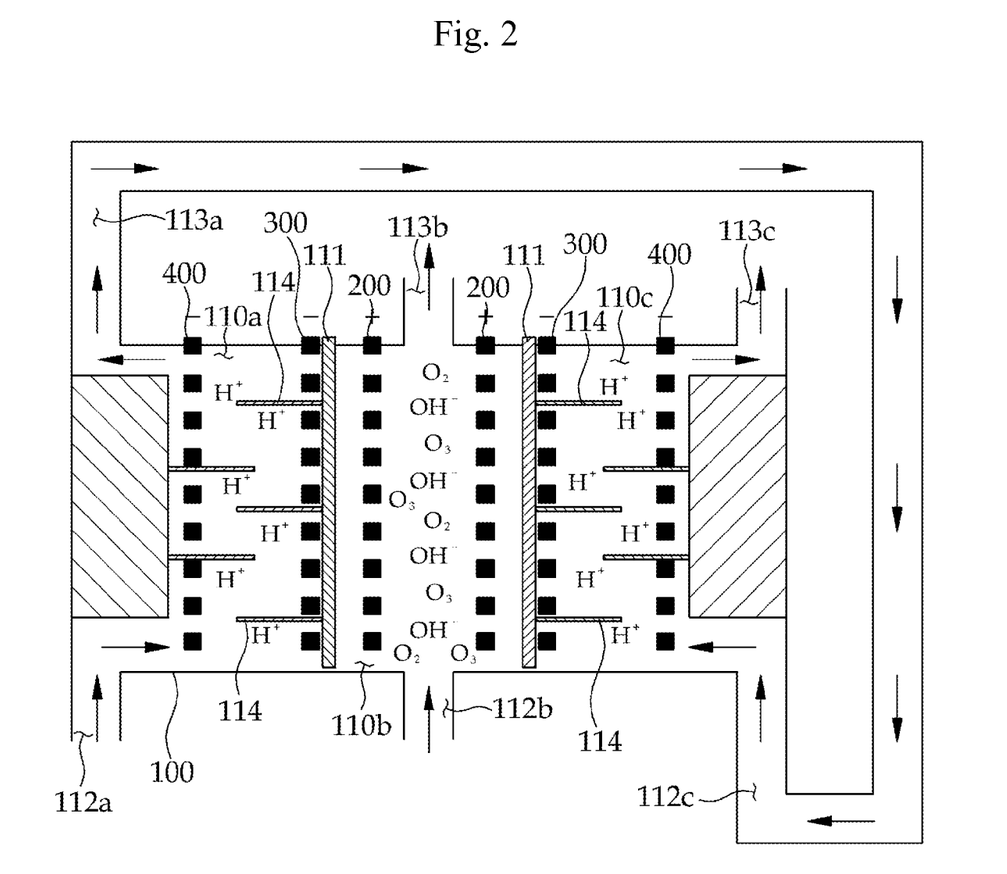
FIG. 2 is a conceptual view schematically illustrating an entire configuration of an electrolytic bath for manufacturing acid water according to a second embodiment of the present invention.

As illustrated in FIG. 2, an electrolytic bath for manufacturing acid water according to a second embodiment of the present invention further includes at least one partition wall 114 in each of the first and second compartments 110a and 110c, compared with the first embodiment. Here, the same reference numerals are given to the same parts as those in the first embodiment, and the description thereof will not be repeated.

In this embodiment, only the partition wall 114 serving as an additional part will be described. At least one partition wall 114 is provided at a predetermined position of each of the first and second compartments 110a and 110c. This is to enable a staying time of the acid water, in which the acid water passing through the first and second compartments 110a and 110c remains in the first and second compartments 110a and 110c, to be long, such that more ion exchange may occur.

Therefore, more ion exchange of the hydrogen ions may be performed in the first and second compartments 110a and 110c, and thus the density of the hydrogen ions contained in the acid water may be further increased.

Third Embodiment

Figure 3:
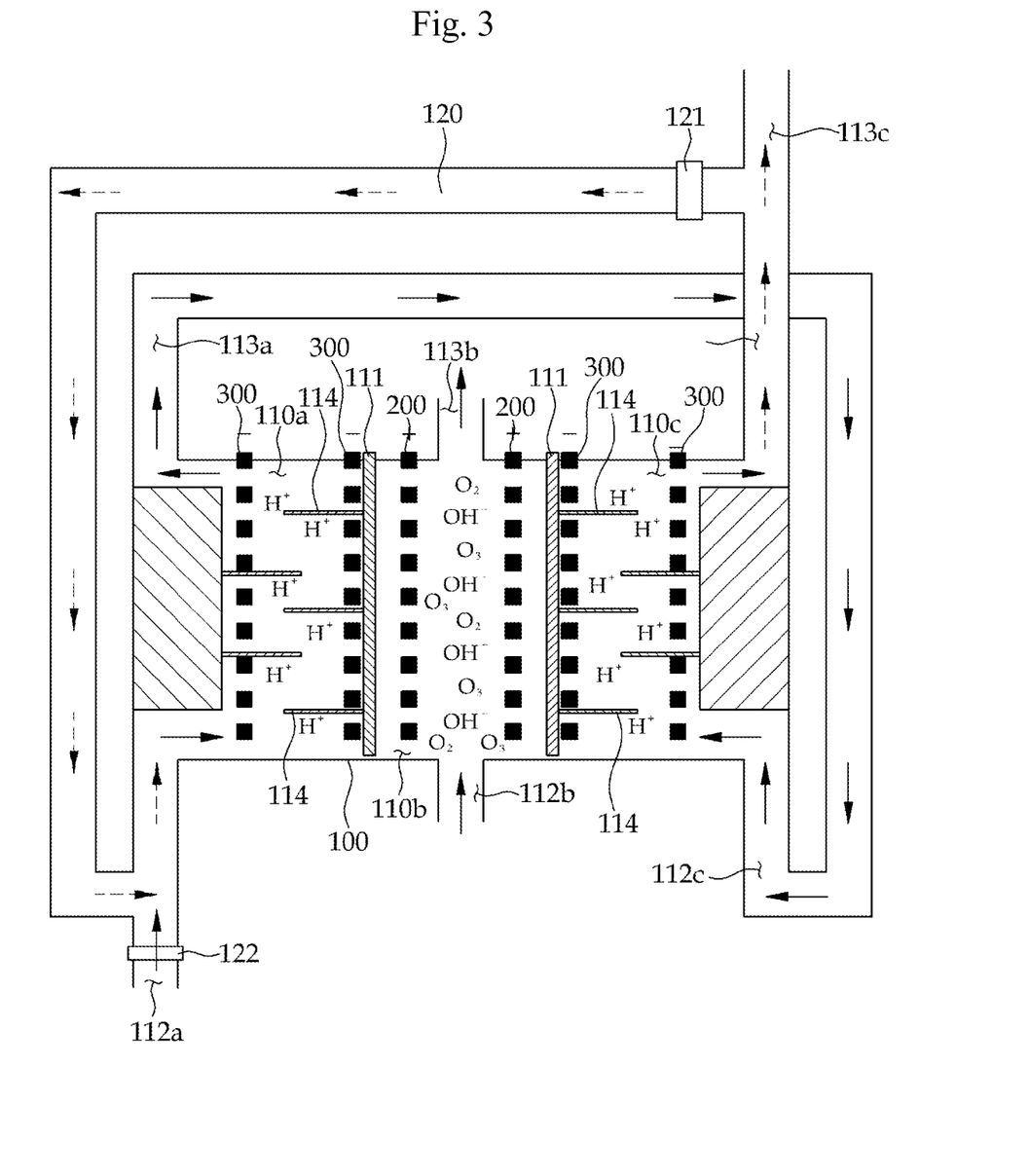
FIG. 3 is a conceptual view schematically illustrating an entire configuration of an electrolytic bath for manufacturing acid water according to a third embodiment of the present invention.

As illustrated in FIG. 3, an electrolytic bath for manufacturing acid water according to a third embodiment of the present invention further includes a branch pipe 120, and first and second valves 121 and 122 in addition to the configuration of the second embodiment. Here, the same reference numerals are given to the same parts as those in the second embodiment, and the description thereof will not be repeated, but only the branch pipe 120 will be described as an additional part.

In the third embodiment, as illustrated in FIG. 3, the branch pipe 120 is connected between the third outlet port 113c and the first inlet port 112a. At this time, the branch pipe 120 is configured to selectively mix the acid water branched through the third outlet port 113c with the raw material water supplied from an outside through the first inlet port 112a, and also connected to discharge the acid water through the third outlet port 113c.

To this end, the first valve 121 is provided at the branch pipe 120 to selectively branch some of the acid water discharged through the third outlet port 113c to the first inlet port 112a. Further, the second valve 122 is provided at the first inlet port 112a to selectively block introduction of the raw material water into the first compartment 110a from an outside through the first inlet port 112a. An operation of the valves is shown in the following Table 7.

TABLE 7

| First valve 121 | Second valve 122 | Operation |
|---|---|---|
| Open | Closed | Since some of the acid water discharged through the third outlet port 113c is circulated into the first compartment 110a and then electrolyzed again, the DH may be increased. This may be used to increase the DH when the DH of the acid water is low, or to obtain high density acid water. Further, this may be used to control the DH of the acid water discharged through the third outlet port 113c. |
| Open | Open | While the acid water is discharged through the third outlet port 113c, some is circulated into the first compartment 110a to increase the DH of the acid water. This may obtain the effect of increasing the DH as described above, and may also increase an amount of the electrolyzed acid water because the raw material water is supplied into the first compartment 110a through the first inlet port 112a from the outside. |
| Closed | Open | Like in the second embodiment, the raw material water is typically supplied, and then the acid water is discharged. |

In the third embodiment, as described above, when it is necessary to increase the DH, the acid water to be discharged is circulated through the branch pipe 120 and the first and second valves 121 and 122, and thus it is possible to increase the DH and also to control the DH and the amount of the acid water to be discharged.

Fourth Embodiment

Figure 4:
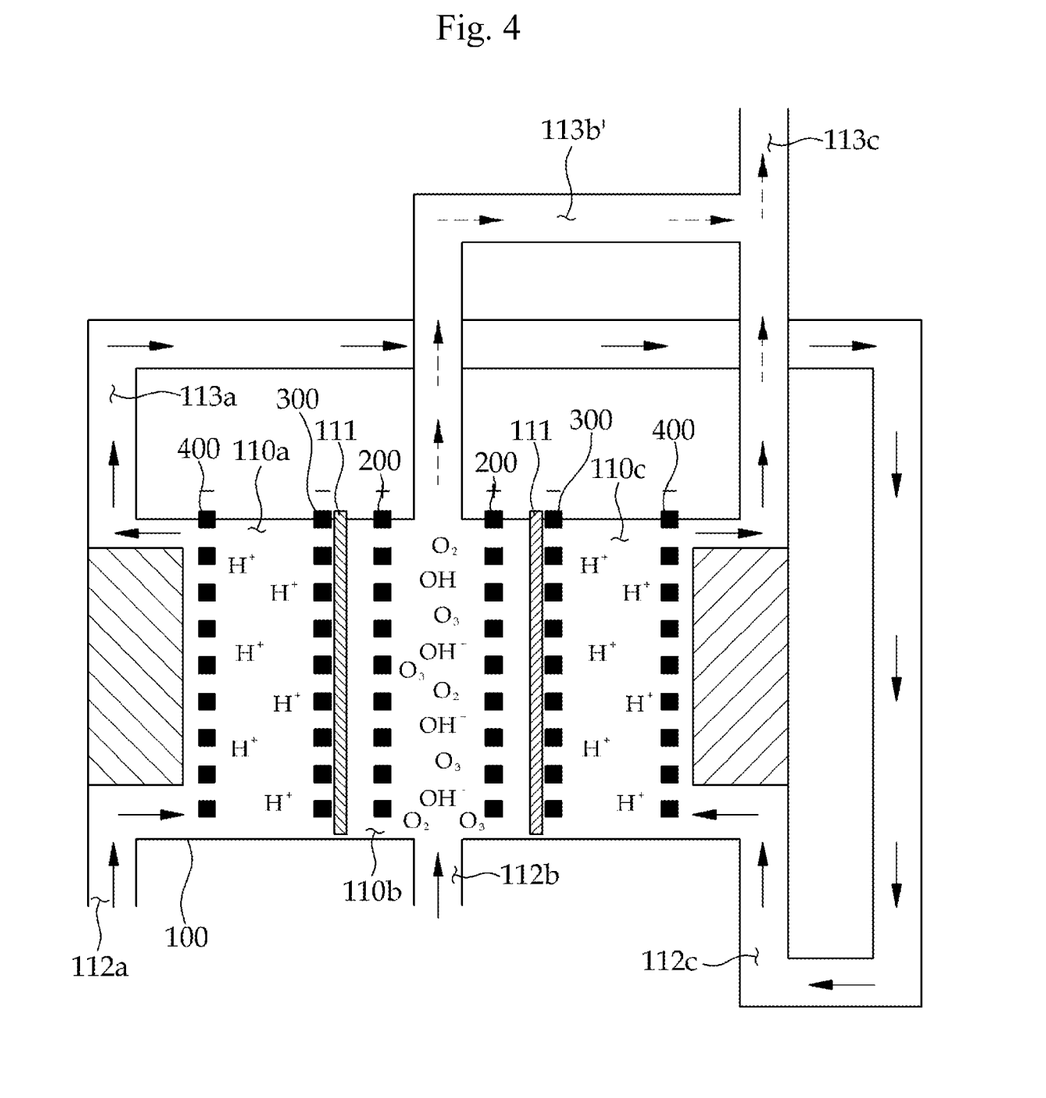
FIG. 4 is a conceptual view schematically illustrating an entire configuration of an electrolytic bath for manufacturing acid water according to a fourth embodiment of the present invention.

As illustrated in FIG. 4, an electrolytic bath for manufacturing acid water according to a fourth embodiment of the present invention has a configuration in which the second outlet port 113b' is combined with the third outlet port 113c in the configuration of the first embodiment. Here, the same reference numerals are given to the same parts as those in the first embodiment, and the description thereof will not be repeated, but only the second outlet port 113b' and the third outlet port 113c combined with each other will be described. As illustrated in FIG. 4, in the fourth embodiment, the second outlet port 113b' through which the acid oxidized water is discharged and the third outlet port 113c through which the acid reduced water is discharged are combined into one so that the acid oxidized water and the acid reduced water are mixed and then discharged.

This serves to cause a reaction between the acid reduced water, i.e., the hydrogen water, with the rest of the materials separated by the electrolysis, such as $OH^-$, $O_2$ and $O_3$, thereby obtaining the acid water having various components. That is, if the raw material water is electrolyzed, the raw material water is basically dissolved into hydrogen ions ($H^+$) and hydroxyl ions ($OH^-$). The acid water discharged through the third outlet port 113c is the acid reduced water having the hydrogen ions ($H^+$) and hydrogen molecules ($H_2$), and the acid water discharged through the second outlet port 113b' is the acid oxidized water containing the hydroxyl ions ($OH^-$), oxygen molecules ($O_2$), ozone ($O_3$) and the like. As the acid reduced water and the acid oxidized water are mixed, the mixed acid water further contains oxygenated water ($H_2O_2$) generated by the following reaction formula, in addition to the basic components such as the hydrogen ions ($H^+$), the hydrogen molecules ($H_2$), hydroxyl ions ($OH^-$) and ozone ($O_3$). The following Formula 1 shows a reaction process in which the oxygenated water is generated.

$$2H^+ + O_2 + 2e^- \rightarrow H_2O_2 \quad \text{[Formula 1]}$$

This enables the acid water obtained by the electrolytic bath for manufacturing the acid water according to the present invention to be used as industrial water or the like as well as drinking water.

(Use Invention)

The acid water obtained by the electrolytic bath for manufacturing the acid water according to the present invention may be used as drinking water, industrial cleaning water for removing organic materials and particles from a semiconductor wafer, a wafer carrier, an LCD glass, an optical lens and an OLED, or antistatic water.

As described above, according to the present invention, the acid reduced water may be obtained by filling ions electrolyzed through the filling space and increasing the potential difference.

Further, since the deaeration action may be performed during one electrolytic process in the present invention, it is possible to minimize a reaction of the dissolved gas with the acid water even when the internal temperature of the electrolytic bath is increased by the electrolysis or the like. Therefore, it is possible to obtain the stable acid water having high purity.

According to the present invention, as the acid water in which the deaeration action is achieved is circulated and electrolyzed again with the deaeration action, it is possible to obtain the acid water having the high conductivity.

The electrolytic bath for manufacturing acid water and the using method of the water according to the present invention has the following effects:

(1) The present invention has the three compartments formed in one housing and configured to obtain the acid water, while the electrolytic action along with the deaeration action are simultaneously performed through one electrolytic process, and thus it is possible to obtain the acid reduced water having the high electrical conductivity and the high purity.

(2) In particular, since the present invention is configured such that some of the acid reduced water having the high electrical conductivity and the high purity is circulated and electrolyzed again, and the acid water obtained through the present invention has an effect of being electrolyzed twice, it is possible to increase the density of the hydrogen ions and thus to obtain the acid reduced water having the high electrical conductivity and the high purity.

(3) Since at least one partition wall is provided in the compartment through which the acid reduced water obtained through the electrolysis and the ion exchange passes such that a flow direction of the acid reduced water can be changed, the staying time in which the acid reduced water remains in the compartment is extended, and thus it is possible to increase an ion separation effect and to obtain the acid water having the high purity.

(4) By providing the acid water in which the acid reduced water and the acid oxidized water obtained by the electrolytic action and the deaeration action are mixed, it is possible to obtain an ion effect due to the hydrogen ions and also to obtain the acid water further containing the components such as the ozone and the oxygenated water generated by the reaction of the oxygen and the hydrogen in addition to the hydrogen ions and the hydroxyl ions.

(5) Since the present invention uses the ion exchange membranes instead of an ion exchange resin, the problem of deterioration of durability thereof does not occur unlike the existing ion exchange membranes, and thus a lifespan thereof extends.

(6) According to the present invention, the pure water (RO) or the deionized water (DI) having the low conductivity as well as the tap water containing a large amount of foreign substances and thus having the high conductivity can be used as the raw material water used in the electrolytic process.

(7) The acid water obtained through the present invention can be used as drinking water, cleaning water for removing organic materials and particles from a semiconductor wafer, a wafer carrier, an LCD glass, an optical lens and an OLED, or antistatic water.

(8) According to the present invention, as the raw material water flows between the electrodes installed to be spaced the predetermined distance from each other, the reaction occurs at the surface of each electrode, and thus acid water with a high density can be obtained.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. An electrolytic bath for manufacturing acid water, comprising:
    a housing having first, second and third compartments divided by two ion exchange membranes installed to be spaced a first predetermined distance from each other therein, a first inlet port and a first outlet port provided at the first compartment, a second inlet port and a second outlet port provided at the second compartment, and a third inlet port and a third outlet port provided at the third compartment;
    two first electrodes which are installed in the second compartment to face each other and be spaced a second predetermined distance from each of the ion exchange membranes, and to which positive poles are applied;
    two second electrodes which are installed at each of the first and third compartments to be adjacent to each of the ion exchange membranes, and to which negative poles are applied; and
    two third electrodes which are installed at each of the first and third compartments to be spaced a third predetermined distance from each of the second electrodes, and to which negative poles are applied,
    wherein the first outlet port is connected with the third inlet port.

2. The electrolytic bath of claim 1, wherein the second predetermined distance is 0.1 to 2.0 mm, and is used as a filling space through which water passes.

3. The electrolytic bath of claim 1, wherein the third predetermined distance is 0.1 to 100.0 mm, and is used as a filling space through which raw material water passes.

4. The electrolytic bath of claim 1, wherein the first and third compartments have therein at least one partition wall provided at a predetermined position to change a flow direction of a fluid and thus to extend a staying time of the fluid.

5. The electrolytic bath of claim 1, wherein a branch pipe is provided at the third outlet port to be connected with the first inlet port configured to receive raw material water from an outside, and
    a first valve is installed at the branch pipe to selectively supply or block branched acid water into the first inlet port, and
    a second valve is installed at the first inlet port to selectively supply or block the raw material water from the outside through the first inlet port when the acid water discharged from the third outlet port is supplied into the first compartment.

6. The electrolytic bath of claim 1, wherein the second outlet port and the third outlet port are combined into one.

7. The electrolytic bath of claim 6, wherein the acid water discharged through the combined second and third outlet ports contains $H_2$, $H^+$, $H_2O_2$, and $O_3$.

8. The electrolytic bath of claim 1, wherein the ion exchange membranes are fluorinated cation exchange membranes.

9. The electrolytic bath of claim 1, wherein the first, second and third electrodes are porous platinum electrodes or platinum mesh electrodes.

10. The electrolytic bath of claim 1, wherein an electrical conductivity of the acid water discharged to the first outlet port is 0.067 to 2.000 μS/cm, and an electrical conductivity of the acid water discharged to the third outlet port is 0.1 to 50.0 μS/cm.

11. The electrolytic bath of claim 10, wherein the acid water discharged from the third outlet port has an oxidation-reduction potential of −100 to −700 mV at a temperature of 0 to 100° C.

12. The electrolytic bath of claim 11, wherein the acid water has a dissolved hydrogen density of 0.2 to 3.0 ppm at the temperature of 0 to 100° C.

13. The electrolytic bath of claim 11, wherein the acid water has a pH of 4.0 to 7.5 at the temperature of 0 to 100° C.

14. A method for using acid water obtained by the electrolytic bath according to claim 1, comprising the steps: using the acid water as drinking water, cleaning water for removing organic materials and particles from a semiconductor wafer, a wafer carrier, an LCD glass, an optical lens and an OLED, or antistatic water.

* * * * *